United States Patent [19]

Olschewski et al.

[11] Patent Number: 4,623,270
[45] Date of Patent: Nov. 18, 1986

[54] POCKET CAGE FOR ROLLING BEARING

[75] Inventors: Armin Olschewski, Schweinfurt; Bernhard Bauer, Hassfurt; Hilmar Leuner, Üchtelhausen; Herbert Dobhan, Bergrheinfeld, all of Fed. Rep. of Germany

[73] Assignee: SKF GmbH, Schweinfurt, Fed. Rep. of Germany

[21] Appl. No.: 742,727

[22] Filed: Jun. 7, 1985

[30] Foreign Application Priority Data

Jul. 8, 1984 [DE] Fed. Rep. of Germany ....... 3424741

[51] Int. Cl.⁴ ...................... B21D 53/12; F16C 19/26; F16C 33/20
[52] U.S. Cl. ............................... 384/576; 29/148.4 C; 384/580
[58] Field of Search ............... 384/548, 551, 560, 572, 384/574, 576, 577, 580, 597, 623; 29/148.4 C, 148.4 R, 148.4 A

[56] References Cited

U.S. PATENT DOCUMENTS

| | | | |
|---|---|---|---|
| 3,350,149 | 10/1967 | Oechsler | 384/572 |
| 3,494,684 | 2/1970 | Benson | 384/580 |
| 3,598,459 | 2/1969 | Vannest | 384/580 |
| 3,640,594 | 2/1972 | Aho | 384/560 |
| 4,192,560 | 3/1980 | Hartnett | 384/572 |

FOREIGN PATENT DOCUMENTS

| | | |
|---|---|---|
| 975667 | 4/1962 | Fed. Rep. of Germany . |
| 1933389 | 7/1965 | Fed. Rep. of Germany . |
| 3231216 | 2/1984 | Fed. Rep. of Germany . |

Primary Examiner—Stuart S. Levy
Assistant Examiner—Lynn M. Sohacki
Attorney, Agent, or Firm—Rosen, Dainow & Jacobs

[57] ABSTRACT

A pocket cage for a rolling bearing, e.g. a cylindrical roller bearing, made in a mold with single-piece, radially movable sliders, in particular out of plastic material with low deformability, which cage comprises two side rings connected by webs, with at least the circumferential outer surface or the bore being provided with projections which project into the pockets and extend along only part of the web length for retaining the rolling elements in the radial direction. In particular, a retaining projection is provided on a first side of each web and a recess, i.e. free space, is provided on a second side of each web. The angle between the oblique surface of the recess and the second side surface of the web is greater than or equal to the angle between the surface of the retaining projection which faces the rolling element and the first side surface of the web.

4 Claims, 4 Drawing Figures

POCKET CAGE FOR ROLLING BEARING

FIELD OF THE INVENTION

The invention relates to a pocket cage for a rolling bearing, e.g. a cylindrical roller bearing, made in a mold with single-piece, radially movable sliders, in particular, out of plastic material with low deformability, which cage comprises two side rings connected by webs, with at least the circumferential outer surface or the bore being provided with projections which project into the pockets and extend along only part of the web length for retaining the rolling elements in the radial direction.

BACKGROUND OF THE INVENTION

A cage of the foregoing type is disclosed, for example, in DE-OS No. 3231216. In accordance with the known arrangement of the cage disclosed therein, the projections and the cage webs are compressed during removal of the single-piece, radially movable sliders due to the height of the projections. This means that the cage material must be relatively yielding.

SUMMARY OF THE INVENTION

The object of the invention is to provide a cage of the aforementioned type which is able to securely retain the rolling elements in place while being made of a material having low deformability, e.g. a glass fiber-reinforced material, with low tooling costs.

The object of the invention is achieved by providing a pocket cage of the above-described type wherein a retaining projection is provided on one side of each web and a corresponding oblique recess, i.e. free space, is provided on the other side of each web such that the angle between the wall surface of the recess and a radially directed guide surface for the cylindrical rollers is equal to or greater than the angle between the surface of the retaining projection facing the rolling element and the other radially directed guide surface of the webs.

The cage of the invention can be produced of brittle plastic material in a simple mold or the like, while ensuring that the webs yield during removal of the sliders in the radially outward direction and the retaining projections of the cage are not damaged or broken off.

It is a further feature of the invention that the length of the retaining projections in the axial direction is smaller than the length of the recesses, so that the cage webs are better able to elastically deform during removal of the sliders from the mold.

Furthermore, the cage webs are provided with recesses on the circumferential outer surface and/or on the bore surface in the area of the two side rings. These recesses, on the one hand, contribute to the ability of the cage web to easily elastically deform and, on the other hand, serve to reduce the edge stresses arising from rolling of the cylindrical elements.

BRIEF DESCRIPTION OF THE DRAWINGS

The preferred embodiments of the pocket cage according to the invention will be described in detail with reference to the following drawings, wherein.

DETAILED DESCRIPTION OF THE PREFERRED EMBODIMENTS

Figure 1:
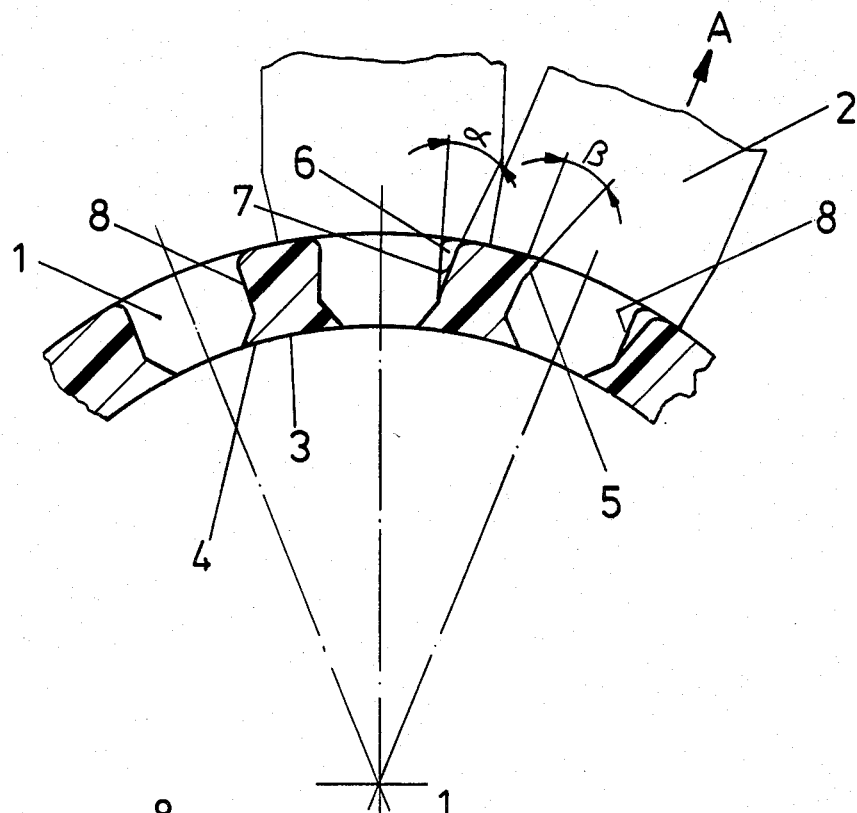
FIG. 1 is a cross-sectional view taken along section A-B (see FIG. 2) of the preferred embodiment of the invention.
Figure 2:
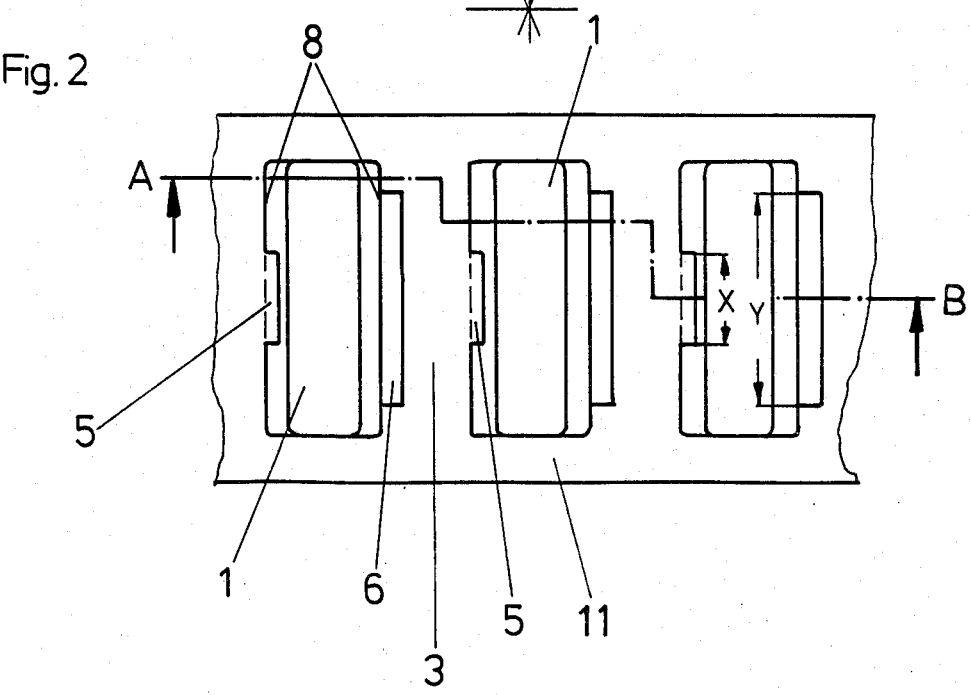
FIG. 2 is a top view of the cage depicted in FIG. 1.

A plastic cage for the cylindrical elements of a rolling bearing is depicted in FIGS. 1 and 2. The cage can be made by casting or injection molding. The cage comprises two side rings 11 connected by a plurality of webs 3. The cage pockets 1 are constructed such that upon removal of the one-piece radial mold sliders 2 (only partly depicted in FIG. 1), compression of the retaining projections 5 and the cage web 3 does not occur. The cylindrical rollers (not shown) are retained in the cage and prevented from being radially inwardly displaced by means of projections 4, which extend into the cage pocket 1 on both sides. The radially outer retention of the rolling elements results from the retaining projections 5. These retaining projections 5 are provided on only one of the two axially extending sides of each web, while the other axially extending side has a first oblique recess, 6 formed therein, so that each retaining projection 5 extending into a cage pocket 1 is associated with a first recess 6 on the other side of the same cage web and the cage web 3 will be elastically deformed in the direction of the respective associated first recess 6 and thus the adjacent cage pocket 1 during removal of the one-piece radial mold slider 2. To accomplish this, the angle $\alpha$ is made equal to or greater than the angle $\beta$, where $\alpha$ is the angle between the wall surface 7 of the first recess 6 and the radially directed guide surface 8 for the cylindrical rollers, and $\beta$ is the angle between the surface of the retaining projection 5 which faces the rolling element and the radially directed guide surface 8. As a result of this arrangement, during extraction of the radial mold sliders 2 in the direction A (see FIG. 1), a first recess 6 exists between the slider 2 inserted in a first cage pocket 1 and the wall surface 7, so that the cage web 3 between the first cage pocket and a second cage pocket can elastically yield when compressive forces are exerted thereon by the slider 2 being extracted from the second cage pocket. The extraction of the slider 2 from the second cage pocket will forcibly displace the retaining projection 5 in a circumferential direction toward the first cage pocket. The first recess 6 between the cage web 3 and the slider 2 in the adjacent first cage pocket enables the web to elastically flex during deflection of the retaining projection formed thereon, thereby avoiding damage to the pocket cage during extraction of the mold sliders. In order that the cage web 3 can be easily elastically deformed, the length X of the retaining projection 5 (see FIG. 2) is smaller than the length Y of the first recess 6.

Figure 3:
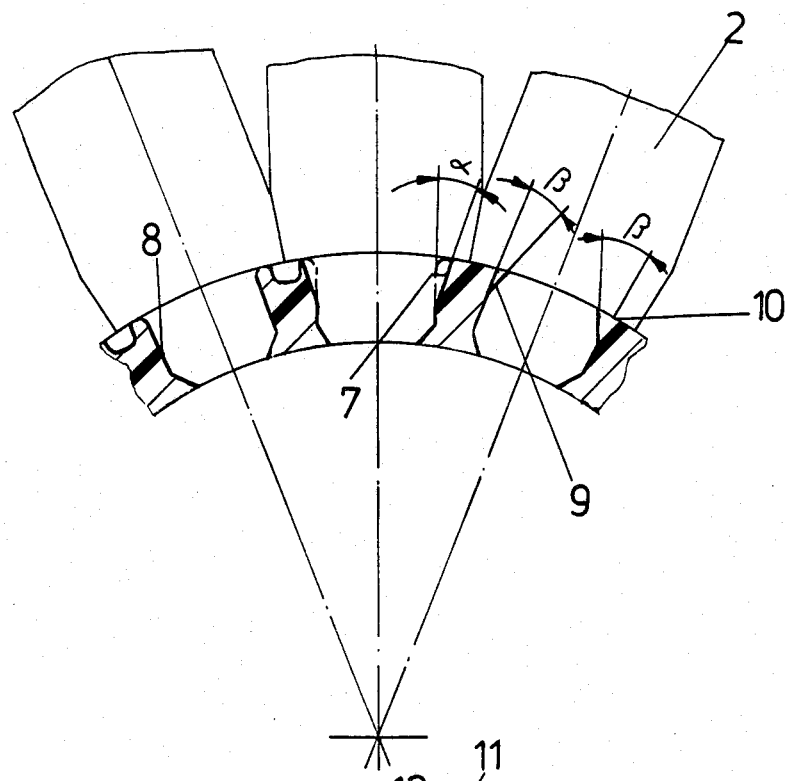
FIG. 3 is a cross-sectional view taken along section C-D (see FIG. 4) of a further embodiment of the invention.
Figure 4:
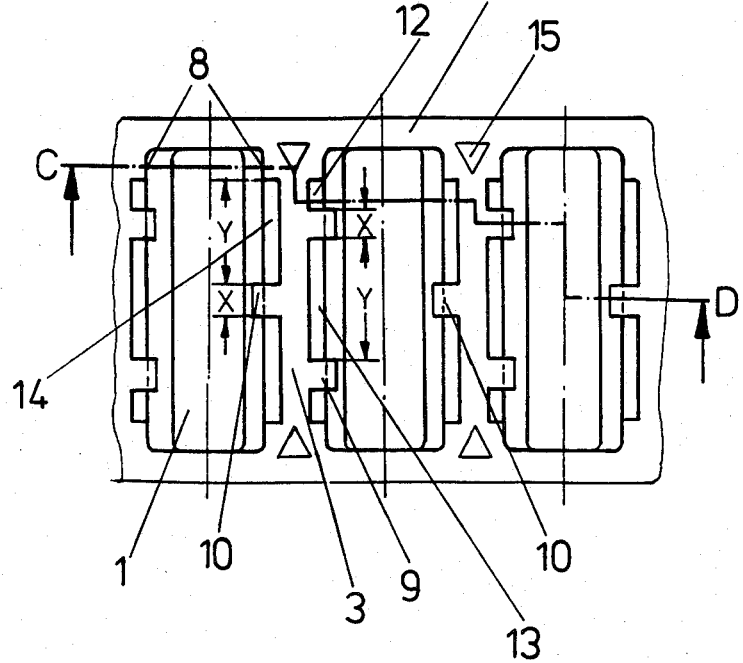
FIG. 4 is a top view of the cage depicted in FIG. 3.

The FIGS. 3 and 4 show a further embodiment of the cage which is distinguishable from the above-described construction essentially in that on the cage webs 3 a plurality of retaining projections 9, 10 are arranged. Each cylindrical roller is retained in the corresponding cage pocket and prevented from being radially outwardly displaced by means of three retaining projections 9, 10. Two retaining projections 9 are formed on one roller-confronting side of each web 3 toward the respective cage side rings 11 and one retaining projection 10 is formed on the other side of each web 3, with retaining projection 10 being axially located along the middle of the web length and between the two retaining projections 9. The first, second and third recesses 12, 13, and 14 respectively associated with retaining projections 9, 10 are each respectively arranged on the opposite side of the cage web 3 (i.e. the side opposite to the web side on which the associated projection is formed), so that the cage web 3 undergoes serpentine deformation during removal of the radial mold sliders 2 and the sliders can be extracted without difficulty from the cage pockets 1. Furthermore, it is advantageous to provide recesses 15 on the circumferential outer surface and/or the circumferential inner surface (i.e. bore) of the cage at the junction of the web 3 and the two side rings 11, which recesses facilitate the deformation of cage web 3 and serve to reduce edge stresses arising from rolling of the cylindrical elements.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed. Thus, the invention is not limited to cages for cylindrical rolling elements; on the contrary, the invention is equally applicable to cages for use with spherical rolling elements.

What is claimed is:

1. In a pocket cage for a rolling bearing made in a mold with single-piece, radially movable sliders, the cage comprising two side rings connected by a plurality of webs, each of said webs having a first projection for retaining a rolling element in a pocket in a radial direction, said first retaining projection projecting into said pocket at the circumferential outer surface of said web and extending along only a portion of the length of said web, said first retaining projection being provided on one side of each web and a first recess being provided on the opposite side of each web, the improvement wherein said first retaining projection is arranged to deflect in a substantially circumferential direction as the radially movable slider which molds said first retaining projection is radially outwardly removed from said pocket, said cage being made of material having low deformability, and the length of said first recess being sufficiently greater than the length of said first retaining projection such that said web undergoes elastic deformation as said slider is removed.

2. The pocket cage of claim 1, wherein each of said webs has second and third retaining projections formed on said other side, said first recess being arranged between said second and third retaining projections.

3. The pocket cage of claim 2, wherein second and third recesses are formed on said one side of said web, said first retaining projection being arranged between said second and third recesses.

4. The pocket cage of claim 1, wherein each of said webs is provided with axially directed recesses on the circumferential outer surface thereof in the vicinity of said side rings, said axially directed recesses being configured to increase the elastic deformation of said web and to reduce edge stresses arising from rolling of a rolling element in said pocket.

* * * * *